(12) United States Patent
Wong et al.

(10) Patent No.: US 9,964,156 B2
(45) Date of Patent: May 8, 2018

(54) MECHANICAL END-EFFECTOR CHANGER AND METHOD OF USING SAME

(71) Applicant: HIWIN TECHNOLOGIES CORP., Taichung (TW)

(72) Inventors: Chen-Ming Wong, Taichung (TW); Ming-Shiou Liu, Taichung (TW); Yan-Shun Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 336 days.

(21) Appl. No.: 14/803,474

(22) Filed: Jul. 20, 2015

(65) Prior Publication Data

US 2017/0021431 A1 Jan. 26, 2017

(51) Int. Cl.
| | |
|---|---|
| *B23B 31/171* | (2006.01) |
| *F16D 1/10* | (2006.01) |
| *B23B 31/107* | (2006.01) |
| *B25J 15/04* | (2006.01) |

(52) U.S. Cl.
CPC ............ *F16D 1/10* (2013.01); *B23B 31/1074* (2013.01); *B25J 15/0408* (2013.01); *B23B 2260/136* (2013.01)

(58) Field of Classification Search
CPC ... B25J 15/0408; B25J 15/04; B23B 31/1074; B23B 2260/136; F16D 1/10
See application file for complete search history.

(56) References Cited

U.S. PATENT DOCUMENTS

| | | | |
|---|---|---|---|
| 4,708,548 A | 11/1987 | Taylor et al. | |
| 4,733,457 A * | 3/1988 | Tega | B25J 13/082 279/75 |
| 4,809,747 A * | 3/1989 | Choly | B25J 15/04 137/614.06 |
| 5,002,500 A * | 3/1991 | Zuccaro | B23K 11/318 439/348 |
| 5,397,159 A * | 3/1995 | Sartorio | B25J 15/0004 294/86.4 |
| 6,073,512 A | 6/2000 | McCormick et al. | |
| 8,961,213 B2 * | 2/2015 | Retailleau | H01R 13/6276 439/345 |
| 9,108,286 B2 * | 8/2015 | Casperson | B23Q 1/0072 |
| 2007/0235949 A1 | 10/2007 | Gloden et al. | |

* cited by examiner

*Primary Examiner* — Matthieu F Setliff
(74) *Attorney, Agent, or Firm* — Muncy, Geissler, Olds & Lowe, P.C.

(57) ABSTRACT

A mechanical end-effector changer includes a first connection unit and a second connection unit. The first connection unit has mounted therein multiple movable members and mating elastic members. Subject to the linking relationship between each movable member and the respective elastic member, the first connection unit and the second connection unit can be automatically connected together or detached from each other, facilitating end-effector change.

9 Claims, 10 Drawing Sheets

MECHANICAL END-EFFECTOR CHANGER AND METHOD OF USING SAME

BACKGROUND OF THE INVENTION

1. Field of the Invention

The present invention relates to robot tool changer technology, and more particularly, to a mechanical end-effector changer at the end of a robotic arm to be changed.

2. Description of the Related Art

Robotic arm has been widely used for industrial manufacturing. On the one hand, it can reduce the problem of decrease in product yield caused by the implementation of repetitive workflows by labor, on the other hand, it can replace human labor in harsh environmental conditions, preventing the harmful effects on the health of workers and maintaining good machining precision. However, in the manufacturing process, robotic arm must be used with an end-effector changer for allowing the robotic arm to change end-effectors (e.g. grippers, vacuum cups or drills), for processing different workpieces.

U.S. Pat. No. 6,073,512 discloses an end-effector changer entitled "Manual quick change tool changer", which includes a master plate connected to a rotatable sprocket and a thrust bearing engaging the sprocket. This design of end-effector changer has the drawback of operational inconvenience. Further, if the thrust bearing is lost accidentally during the operation of the robotic arm, the end-effector changer is likely to cause harm to the workers. Further, U.S. Pat. No. 4,708,548 teaches the use of a manually operated rotatable member to control movement of positioning balls. When the positioning balls are engaged into respective radial bores, a first unit and a second unit are locked together. On the contrary, when the positioning balls are disengaged from the respective radial bore, the first unit and the second unit are unlocked and separable from each other. In this design, the connection strength between the first unit and the second unit is not strong enough, limiting the weight and specifications of the mating end-effectors. Further, US 2007/0235949 discloses another design of robotic tool changer that that utilizes a compressed fluid to move a piston, enabling rolling members to be actuated by the piston to lock a first unit to a second unit. When going to separate the first unit from the second unit, input the compressed fluid in the reversed direction to move the piston in direction away from the rolling members, and thus, the rolling members are permitted to move to the disengaged position. According to this prior art design, many extra equipments and arrangements (such as pipelines, storage tank, pressure pump, etc.) are necessary for the application of the compressed fluid, resulting in increased cost and causing inconvenience of the movement of the machine.

SUMMARY OF THE INVENTION

The present invention has been accomplished under the circumstances in view. It is the main object of the present invention to provide a mechanical end-effector changer, which facilitates the robotic arm to couple an end-effector without an extra input source, saving the cost and improving operational efficiency.

To achieve this and other objects of the present invention, a mechanical end-effector changer comprises a base frame, a damper, a first connection unit, and a second connection unit. The damper is mounted in the base frame, and adapted to provide a damping effect. The first connection unit comprises a first holder base and a post. The first holder base is supported on the damper. The post extends from the top surface of the first holder base in direction away from the damper, comprising an engagement hole. The second connection unit comprises a second holder base, a first movable member, a first elastic member, a second movable member, a second elastic member, a third movable member, a third elastic member, a fourth movable member, and a fourth elastic member. The second holder base comprises a first chamber, a second chamber, a first through hole and a second through hole. The first chamber is adapted for attaching to the post of the first connection unit. The second chamber extends upwardly from the bottom surface of the second holder base along the extending direction of the axis of the first chamber. The first through hole is disposed in communication between the first chamber and the second chamber. The second through hole has one end thereof disposed in communication with the second chamber, and an opposite end thereof cut through the outer perimeter of the second holder base. The first movable member is movably mounted in the second chamber. The first elastic member is mounted in the second chamber and stopped against the first movable member to impart a downward pressure to the first movable member. The second movable member is movably mounted in the first through hole, and adapted for engaging into the engagement hole of the post of the first connection unit. The second elastic member is mounted in the first through hole and stopped against the second movable member to impart a pressure to the second movable member in direction away from the post of the first connection unit. The third movable member is movably mounted in the first through hole so that on the one hand, the third movable member can be engaged with the first movable member, and on the other hand, the third movable member can be pushed by the first movable member into the inside of the first through hole. The third elastic member is mounted in the first through hole and stopped between the first movable member and the third movable member to move the first movable member and the third movable member in direction away from each other. The fourth movable member is movably mounted in the second through hole, and can be squeezed by the base frame to push the first movable member in direction away from the first connection unit. The fourth elastic member is mounted in the second through hole and stopped against the fourth movable member to move the fourth movable member in direction away from the first movable member.

Thus, subject to the linking relationship among the first, second, third and fourth movable members and the first, second, third and fourth elastic members, the mechanical end-effector changer enables the second connection unit and the first connection unit to be rapidly coupled together. Further, subject to the damping effect of the damper, the second connection unit and the first connection unit can be accurately separated, achieving accurate end-effector change.

Further, in an alternate form of the present invention, the mechanical end-effector changer comprises a first connection unit comprising a post with an engagement hole, and a second connection unit comprising a second holder base, a first movable member, a second movable member, a first movable member, a second movable member, a second elastic member, a third movable member and a third elastic member. The second holder base comprises a first chamber, a second chamber and a first through hole. The second holder base is detachably attached to the post by means of the first chamber. The first through hole is disposed in communication between the first chamber and the second chamber. The first movable member is mounted in the second chamber and movable in and out of the second chamber. The second movable member is mounted in the first through hole, and movable out of the first through hole to engage into the engagement hole. The second elastic member is mounted in the first through hole and adapted to move the second movable member in direction toward the first movable member. The third movable member is mounted in the first through hole and movable out of the first through hole to touch the first movable member. The third elastic member is adapted to push the second movable member and the third movable member.

Thus, mechanical end-effector changer enables the second connection unit and the first connection unit to be rapidly and detachably connected together, achieving end-effector change.

Other advantages and features of the present invention will be fully understood by reference to the following specification in conjunction with the accompanying drawings, in which like reference signs denote like components of structure.

DETAILED DESCRIPTION OF THE INVENTION

Figure 1:
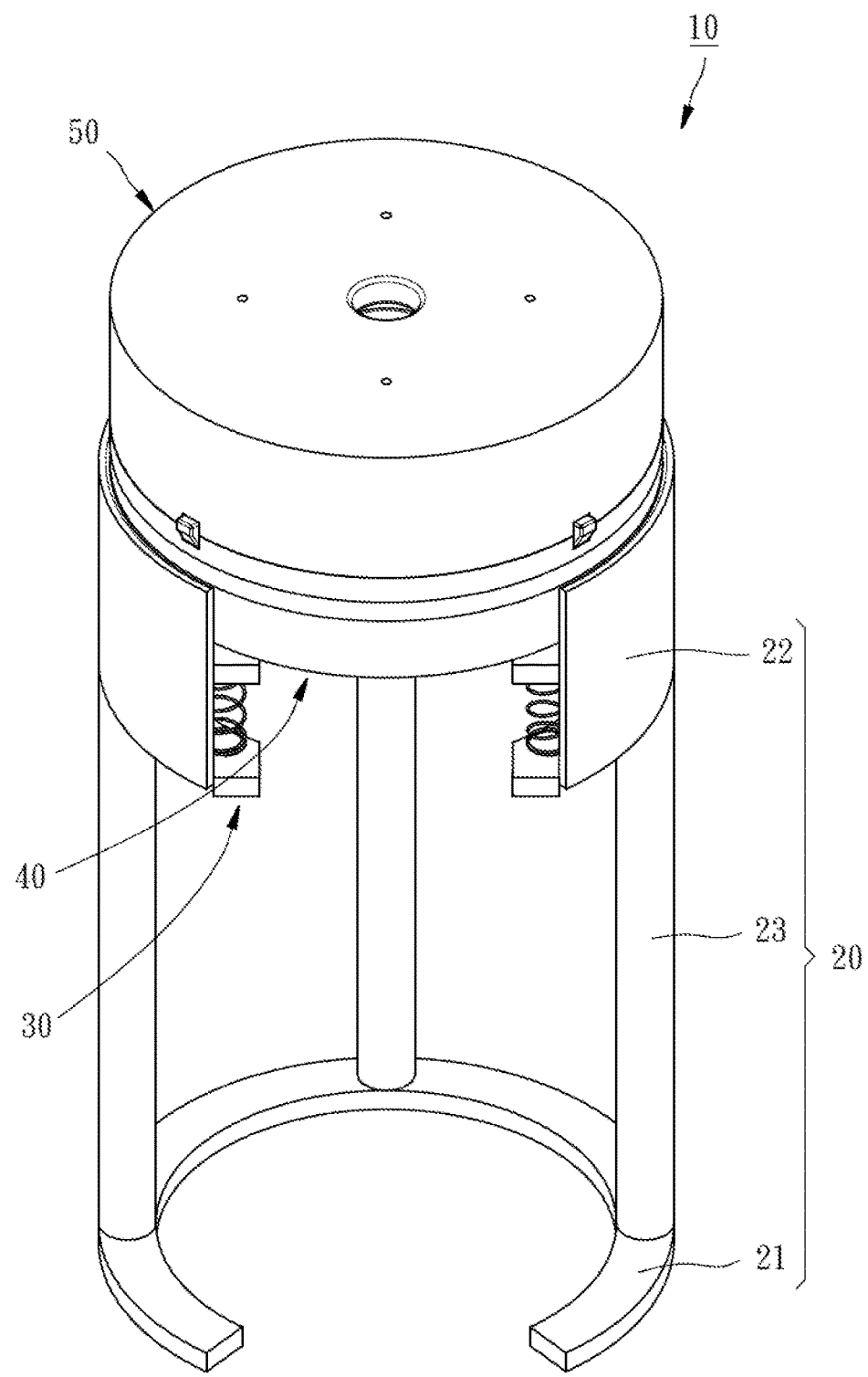
FIG. 1 is an oblique top elevational view of a mechanical end-effector changer in accordance with a first embodiment of the present invention.
Figure 2:
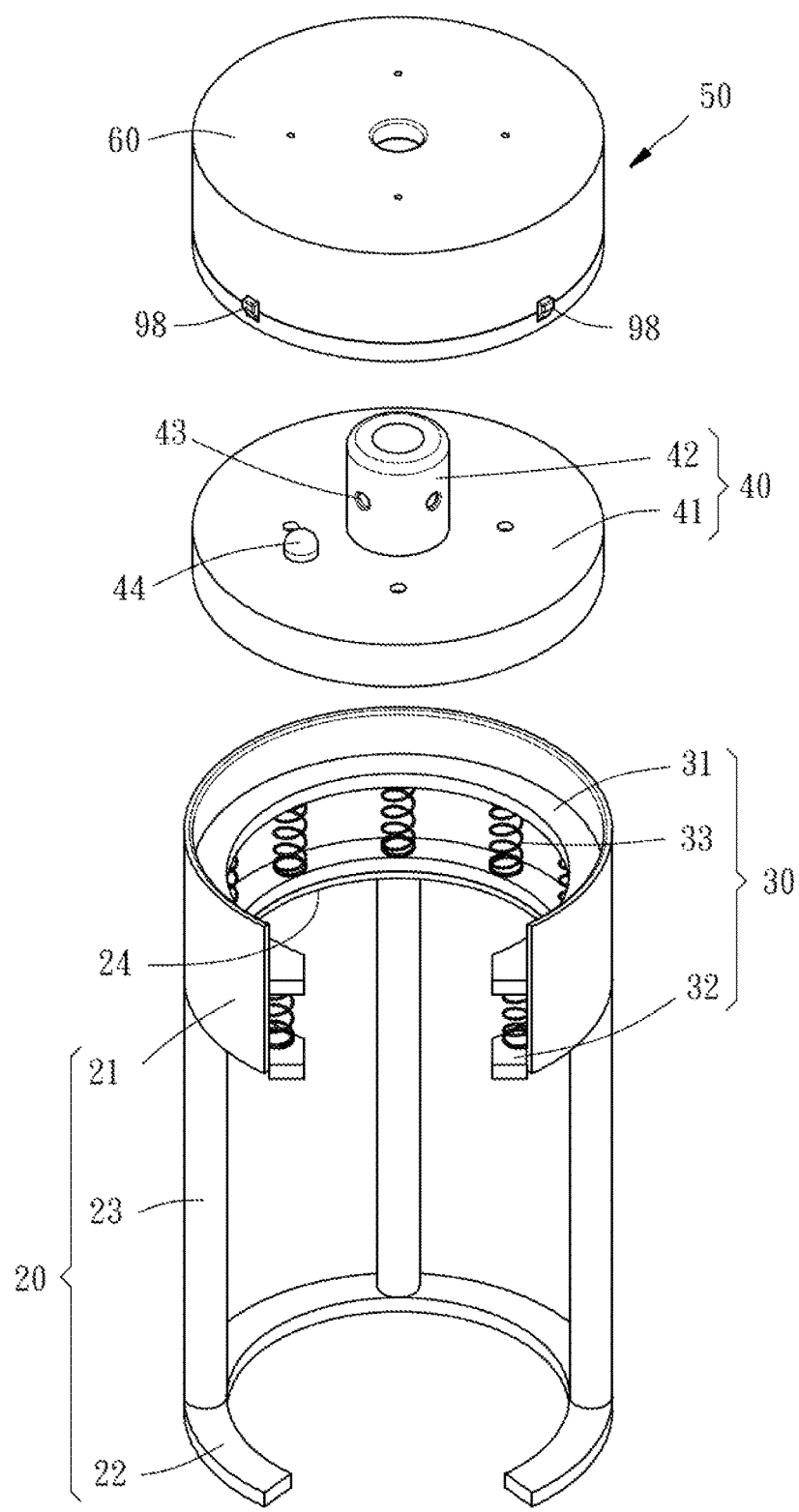
FIG. 2 is an exploded view of the mechanical end-effector changer in accordance with the first embodiment of the present invention.

Referring to FIGS. 1 and 2, a mechanical end-effector changer 10 in accordance with the present invention is shown. The mechanical end-effector changer 10 comprises a base frame 20, a damper 30, a first connection unit 40 and a second connection unit 50.

The base frame 20 comprises a bottom wall 21, a peripheral wall 22 spaced above the bottom wall 21, three support rods 23 connected the bottom wall 21 and the peripheral wall 22, and an inner flange 24 located at an inner perimeter of the peripheral wall 22.

The damper 30 can be a viscoelastic damper, hydraulic damper or vibration damper. In this embodiment, the damper 30 is a viscoelastic damper. However, this option is not a limitation. The damper 30 comprises an upper bearing plate 31, a lower bearing plate 32, and a plurality of viscoelastic damping elements 33 connected the upper bearing plate 31 and the lower bearing plate 32. During installation, the lower bearing plate 32 of the damper 30 is positioned on the inner flange 24 at the inner perimeter of the peripheral wall 22 of the base frame 20.

The first connection unit 40 comprises a first holder base 41 and a post 42. The first holder base 41 is placed on the upper bearing plate 31 of the damper 30 for the connection of an end-effector (not shown). The post 42 extends upwardly from a top surface of the holder base 41 in direction away from the damper 30, having four engagement holes 43 equiangularly spaced around the periphery thereof.

Figure 3:
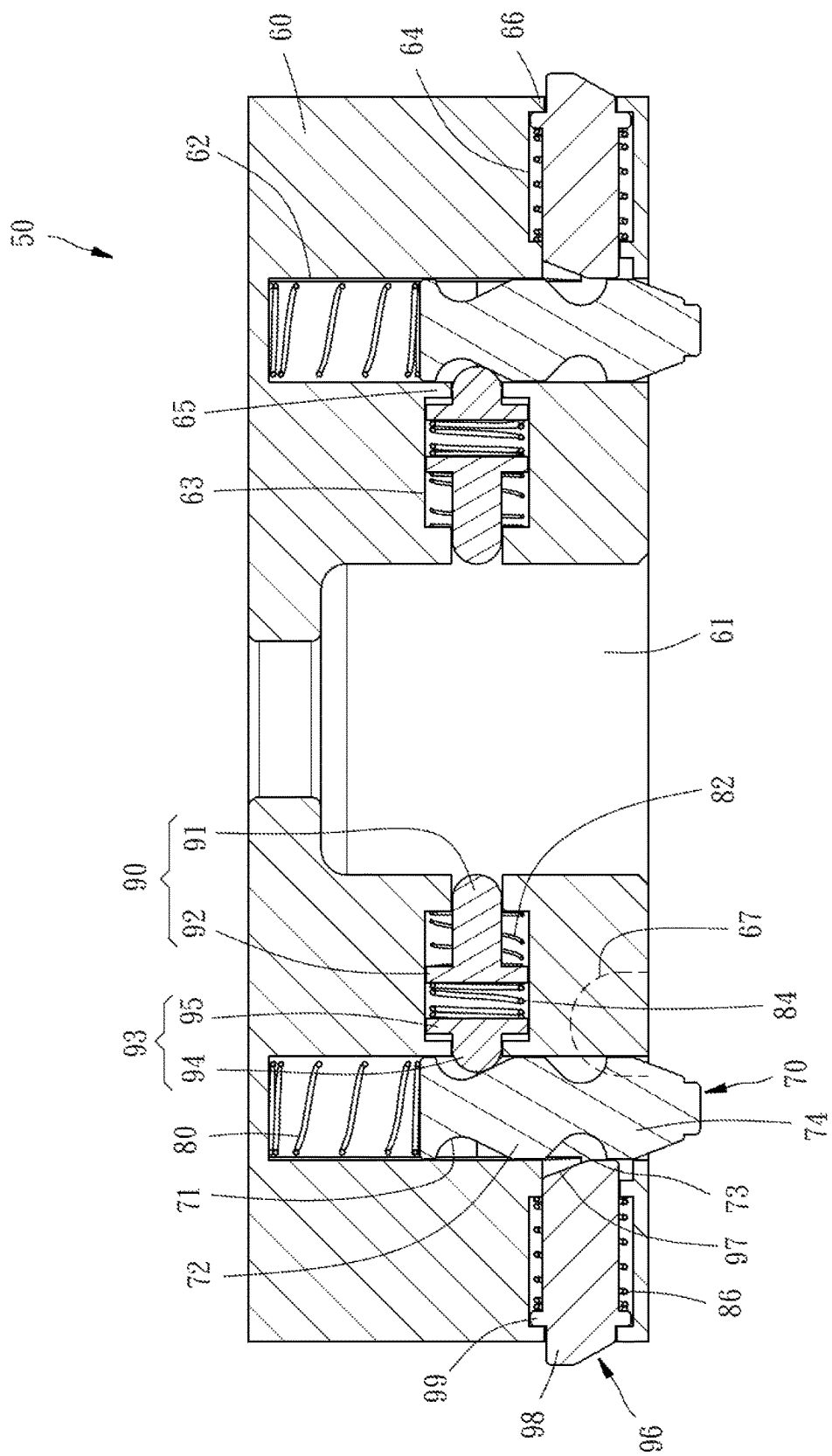
FIG. 3 is a sectional view of the second connection unit of the mechanical end-effector changer in accordance with the first embodiment of the present invention.

Referring to FIG. 3, the second connection unit 50 comprises a second holder base 60, four first movable members 70, four first elastic members 80, four second movable members 90, four second elastic members 82, four third movable members 93, four third elastic members 84, four fourth movable members 96, and four fourth elastic members 86.

The second holder base 60 is adapted for the connection of a robotic arm (not shown), comprising structurally a first chamber 61 and four second chambers 62. The first chamber 61 is located at the center of the second holder base 60. The second chambers 62 are axially extended from a bottom surface of the second holder base 60 toward the inside thereof and spaced around the first chamber 61. The second holder base 60 further comprises four first through holes 63 and four second through holes 64. Each first through hole 63 is disposed in communication with the first chamber 61 and one respective second chamber 62. Each second through hole 64 has one end thereof disposed in communication with one respective second chamber 62, and an opposite end thereof cut through the periphery of the second holder base 60. The second holder base 60 further comprises a first inner ledge 65 at each of two opposite ends of each first through hole 63, and a second inner ledge 66 at each of two opposite ends of each second through hole 64.

Each first movable member 70 comprises sequentially from top to bottom an upper positioning groove 71, a first abutment portion 72 adjacent to the upper positioning groove 71, a lower positioning groove 73 adjacent to the first abutment portion 72, and a first bearing portion 74 adjacent to the lower positioning groove 73. In installation, each first movable member 70 is inserted into one respective second chamber 62 of the second holder base 60 and movable up and down therein.

Each first elastic member 80 is mounted in one respective second chamber 62 of the second holder base 60 and stopped between an end wall of the associating second chamber 62 and a top end of one respective first movable member 70, and adapted for imparting a downward pressure to the respective first movable member 70 to normally hold the respective first movable member 70 in such a position where the first bearing portion 74 of the respective first movable member 70 is disposed outside the respective second chamber 62 of the second holder base 60.

Each second movable member 90 is mounted in one respective first through hole 63 of the second holder base 60, comprising a first engagement portion 91 and a first outer ledge 92. The first outer ledge 92 is connected to one end of the first engagement portion 91.

Each second elastic member 82 is sleeved onto the first engagement portion 91 of one respective second movable member 90 and stopped between the first inner ledge 65 at one end of one respective first through hole 63 of the second holder base 60 and the first outer ledge 92 of the respective second movable member 90 to impart a pressure to the second movable member 90 in direction away from the respective first chamber 61 of the second holder base 60.

Each third movable member 93 is mounted in one respective first through hole 63 of the second holder base 60, comprising a second engagement portion 94 and a second outer ledge 95. The second outer ledge 95 is connected to one end of the second engagement portion 94.

Each third elastic member 84 is mounted in one respective first through hole 63 of the second holder base 60, and stopped between the first outer ledge 92 of one respective second movable member 90 and the second outer ledge 95 of one respective third movable member 93 to impart a pressure to the respective first movable member 90 and the respective third movable member 93 in direction away from each other.

Each fourth movable member 96 is mounted in one respective second through hole 64 of the second holder base 60, comprising a second abutment portion 97 at one end thereof, a second bearing portion 98 at an opposite end thereof and a third outer ledge 99 adjacent to the second bearing portion 98.

Each fourth elastic member 86 is sleeved onto one respective fourth movable member 96, and stopped between the second inner ledge 66 at one end of one respective second through hole 64 of the second holder base 80 and the third outer ledge 99 of one respective fourth movable member 96 to impart a pressure to the respective to the respective fourth movable member 96 in direction away from the respective second chamber 62 of the second holder base 60 so as to normally hold the respective fourth movable member 96 in such a position where the second bearing portion 98 of the respective fourth movable member 96 is disposed outside the respective second through hole 64 of the second holder base 60.

Figure 4:
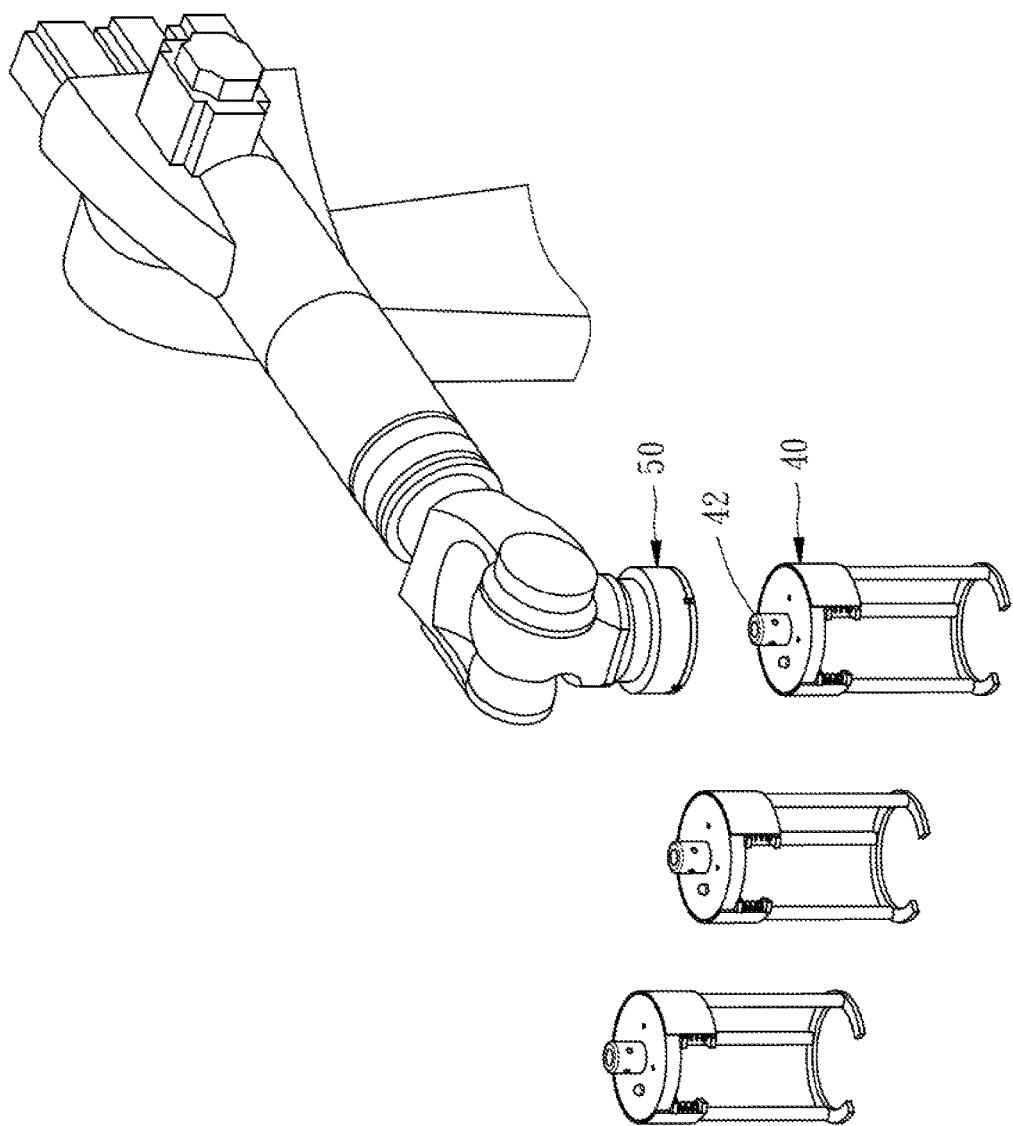
FIG. 4 is a schematic drawing illustrating an operation status of the mechanical end-effector changer in accordance with the first embodiment of the present invention.
Figure 5:
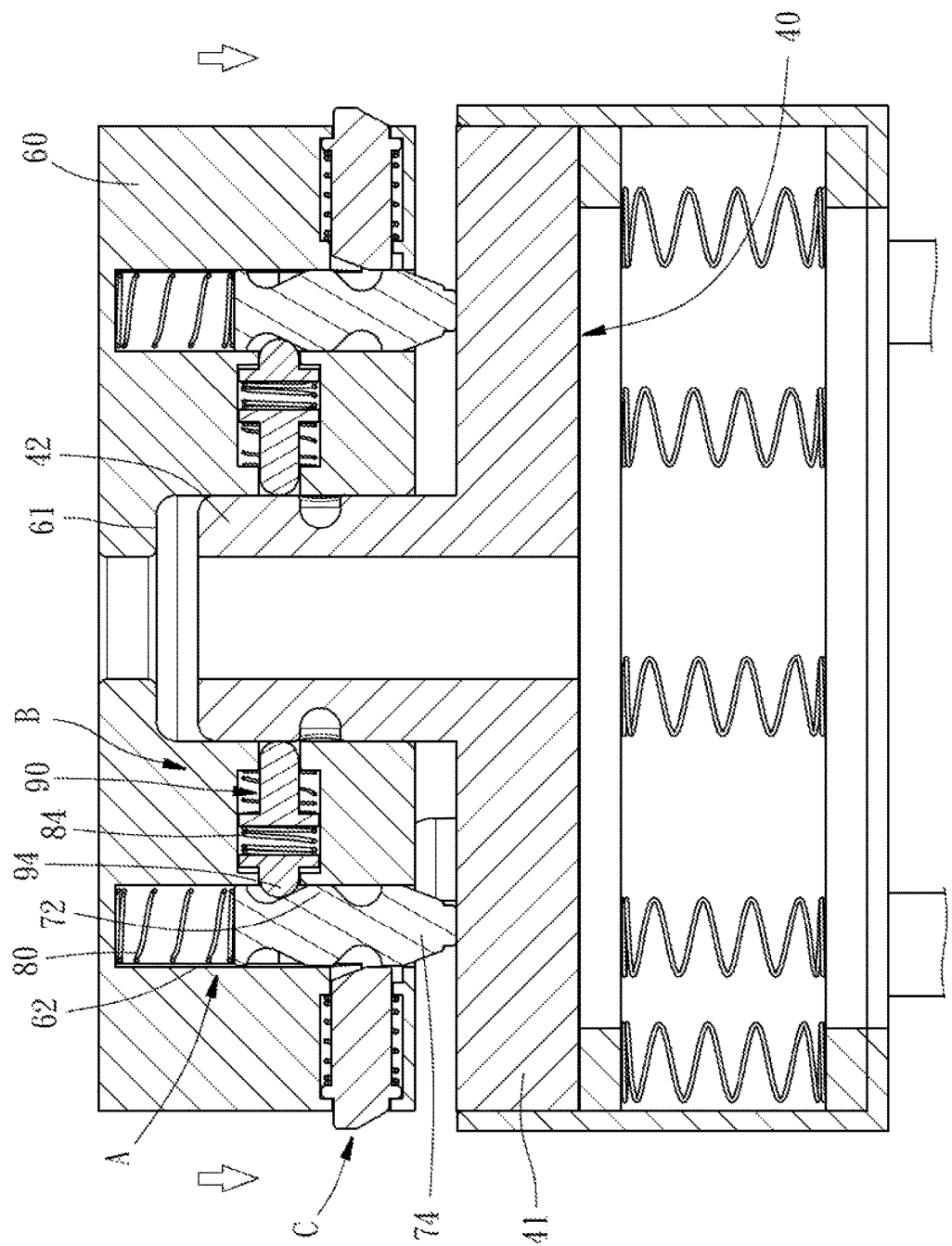
FIG. 5 is a schematic sectional view of the first embodiment of the present invention, illustrating the first movable members touched the first connection unit.

In actual operation, at first, as shown in FIG. 4 and FIG. 5, the second connection unit 50 is carried by the robotic arm toward the first connection unit 40 to attach the first chamber 61 of the second holder base 60 onto the post 42 of the first connection unit 40 gradually. Once the second holder base 60 reaches the position where the first bearing portions 74 of the first movable members 70 touch the top surface of the first holder base 41 of the first connection unit 40, the first movable members 70 will then be moved upwardly into the inside of the respective second chambers 62 of the second holder base 60. During upward displacement of the first movable members 70, one the one hand, the first elastic members 80 will be compressed to store elastic potential energy, one the other hand, the second engagement portions 94 of the third movable members 93 will be squeezed by the first abutment portions 72 of the respective first movable members 70, causing retraction of the third movable members 93 into the respective first through holes 63 of the second holder base 60. When the third movable members 93 are squeezed by the first abutment portions 72 of the respective first movable members 70, the third elastic members 84 synchronously squeeze the respective second movable members 90, moving the respective second movable members 90 in direction toward the post 42 of the first connection unit 40.

Figure 6:
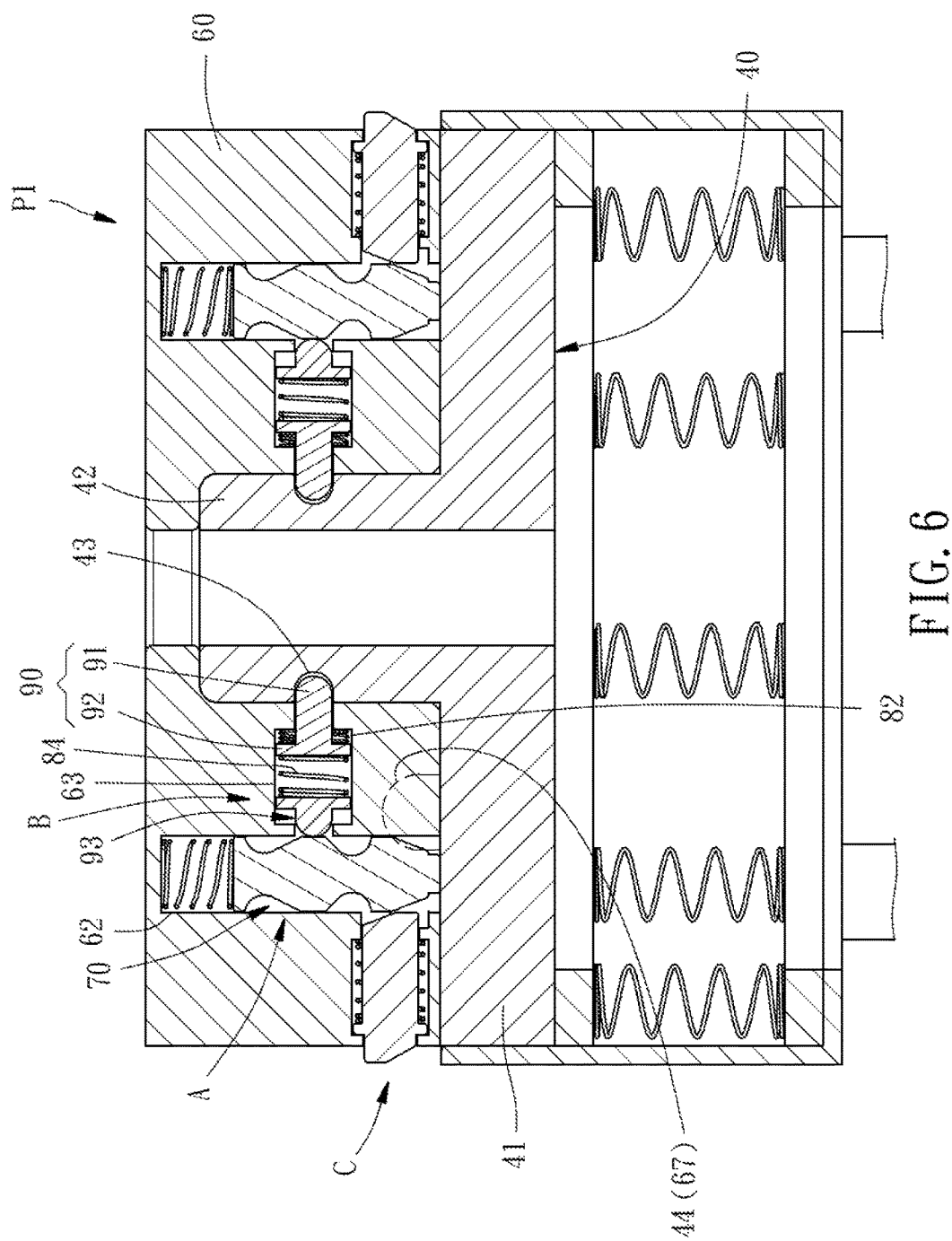
FIG. 6 is similar to FIG. 5, illustrating the second holder base in an engaged position.

As illustrated in FIG. 6, when the second holder base 60 is disposed in an engage position P1, the bottom surface of the second holder base 60 is fully abutted against the top surface of the first holder base 41 of the first connection unit 40 to have the first movable members 70 be entirely received inside the respective second chambers 62 of the second holder base 60 and the third movable members 93 be entirely received in the respective first through holes 63 of the second holder base 60, thus, the third elastic members 84 are squeezed by the respective third movable members 93 to push the respective second movable members 90 and to force the first engagement portions 91 of the respective second movable members 90 into engagement with the respective engagement holes 43 of the post 42 of the first connection unit 40 to secure the second holder base 60 and the first connection unit 40 together. At the same time, the second elastic members 82 are compressed by the first outer ledges 92 of the respective second movable members 90 to store elastic restoring force.

Figure 7:
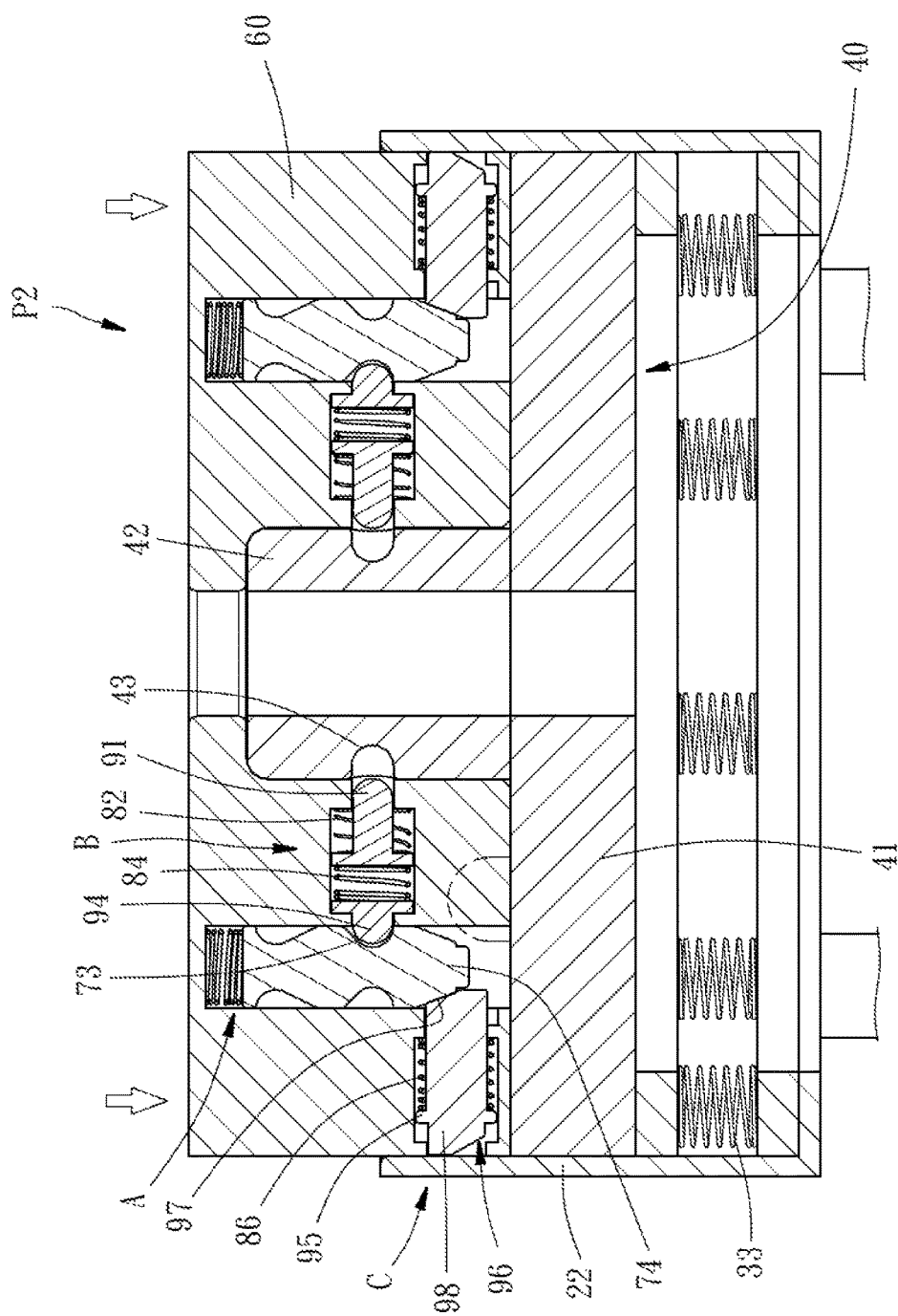
FIG. 7 is similar to FIG. 6, illustrating the second holder base in a release position.

When going to separate the second holder base 60 and the first connection unit 40, the second connection unit 50 is forced by the robotic arm to exert a downward pressure to the first connection unit 40. The process of forcing the second connection unit 50 to press down the first connection unit 40, on the one hand, causes every viscoelastic damping element 33 to deform, on the other hand, enables the second bearing portion 98 of each fourth movable member 96 to be gradually squeezed by the peripheral wall 22 of the base frame 20. At this time, each fourth movable member 96 will compress the respective fourth elastic member 86 with its second outer ledge 95, causing the respective fourth elastic member 86 to store elastic potential energy. At the same time, each fourth elastic member 86 will, by means of its second abutment portion 97, push the first bearing portion 74 of the respective first movable member 70 upwards, moving the first bearing portion 74 of the respective first movable member 70 away from the top surface of the first holder base 41 of the first connection unit 40. When the second connection unit 50 is lowered to a release position P2, as shown in FIG. 7, the third movable members 93 will be forced by the restoring force of the respective third elastic members 84 to engage the respective second engagement portions 94 into the lower positioning grooves 73 of the respective first movable members 70. Under this condition, the third movable members 93 release the thrust relative to the respective third elastic members 84, and then, the third elastic members 84 release the thrust relative to the respective second movable members 90. At this time, the second movable members 90 are forced by the restoring force of the respective second elastic members 82 to disengage the respective first engagement portions 91 from the respective engagement holes 43 of the post 42 of the first connection unit 40, and thus, the robotic arm can carry the second holder base 60 away from the first connection unit 40.

Figure 8:
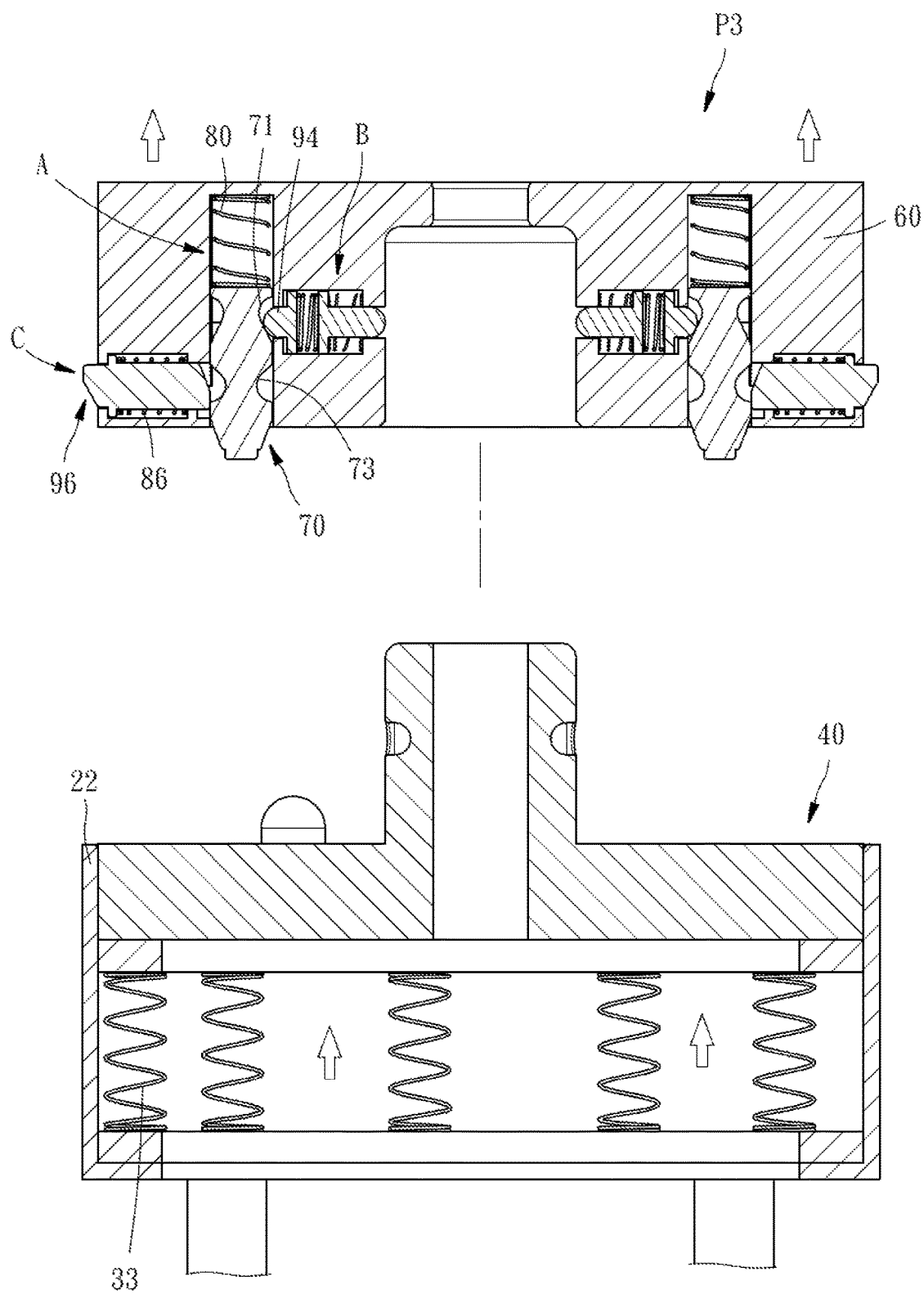
FIG. 8 is similar to FIG. 7, illustrating the second holder base in a separated position.

When the second holder base 60 is completely moved away from the first connection unit 40 to a separated position P3, as shown in FIG. 8, the fourth movable members 96 are not squeezed by the peripheral wall 22 of the base frame 20, thus, the fourth movable members 96 can be moved by the elastic restoring force of the respective fourth elastic members 86 in direction away from the respective first movable members 70, causing the respective fourth movable members 96 to release thrust relative to the respective first movable members 70. At this time, the first movable members 70 will be forced by the elastic restoring force of the respective first elastic members 80 to move downwards, disengaging the lower positioning grooves 73 from the second engagement portions 94 of the respective third movable members 93. Once the first movable members 70 reach the position where the upper positioning grooves 71 are respectively forced into engagement with the second engagement portions 94 of the respective third movable members 93, the first movable members 70 are kept in position.

It is to be noted that, in order to enhance positioning accuracy, the first connection unit 40 is configured to provide a locating rod 44 at the top surface of the first holder base 41; the second holder base 60 is configured to provide a locating groove 67 at the bottom surface thereof. When the second holder base 60 reaches the engaged position P1 shown in FIG. 6, the locating groove 67 of the second holder base 60 is engaged with the locating rod 44 of the first connection unit 40. Further, the first elastic members 80, the second elastic members 82, the third elastic members 84, the fourth elastic members 86 and the viscoelastic damping elements 33 show the relationship of: $K_5>K_1>K_3>K_2$ and $K_1>K_4$, wherein $K_1$ is the spring constant of the first elastic members 80; $K_2$ is the spring constant of the second elastic members 82; $K_3$ is the spring constant of the third elastic members 84; $K_4$ is the spring constant of the fourth elastic members 86; $K_5$ is the spring constant of the viscoelastic damping elements 33. Based on the aforesaid relationship, the mechanical end-effector changer 10 not only can maintain a good linking relationship among the first movable members 70, the second movable members 90, the third movable members 93 and the fourth movable members 96 during movement of the second holder base 60 but also enable every viscoelastic damping element 33 to create a delay effect relative to the first connection unit 40, enabling the first connection unit 40 to be slowly returned to its former position after disconnection of the second holder base 60 and ensuring accurate achievement of the change of the end-effector.

In conclusion, the mechanical end-effector changer 10 utilizes the linking relationship between multiple movable members 70,90,93,96 and respective mating elastic members 80,82,84,86 to let the second holder base 60 and the first connection unit 40 be quickly connected or released, and also utilizes the damping effect of the damper 30 to ensure accurate separation between the second holder base 60 and the first connection unit 40, achieving end-effect change.

Figure 9:
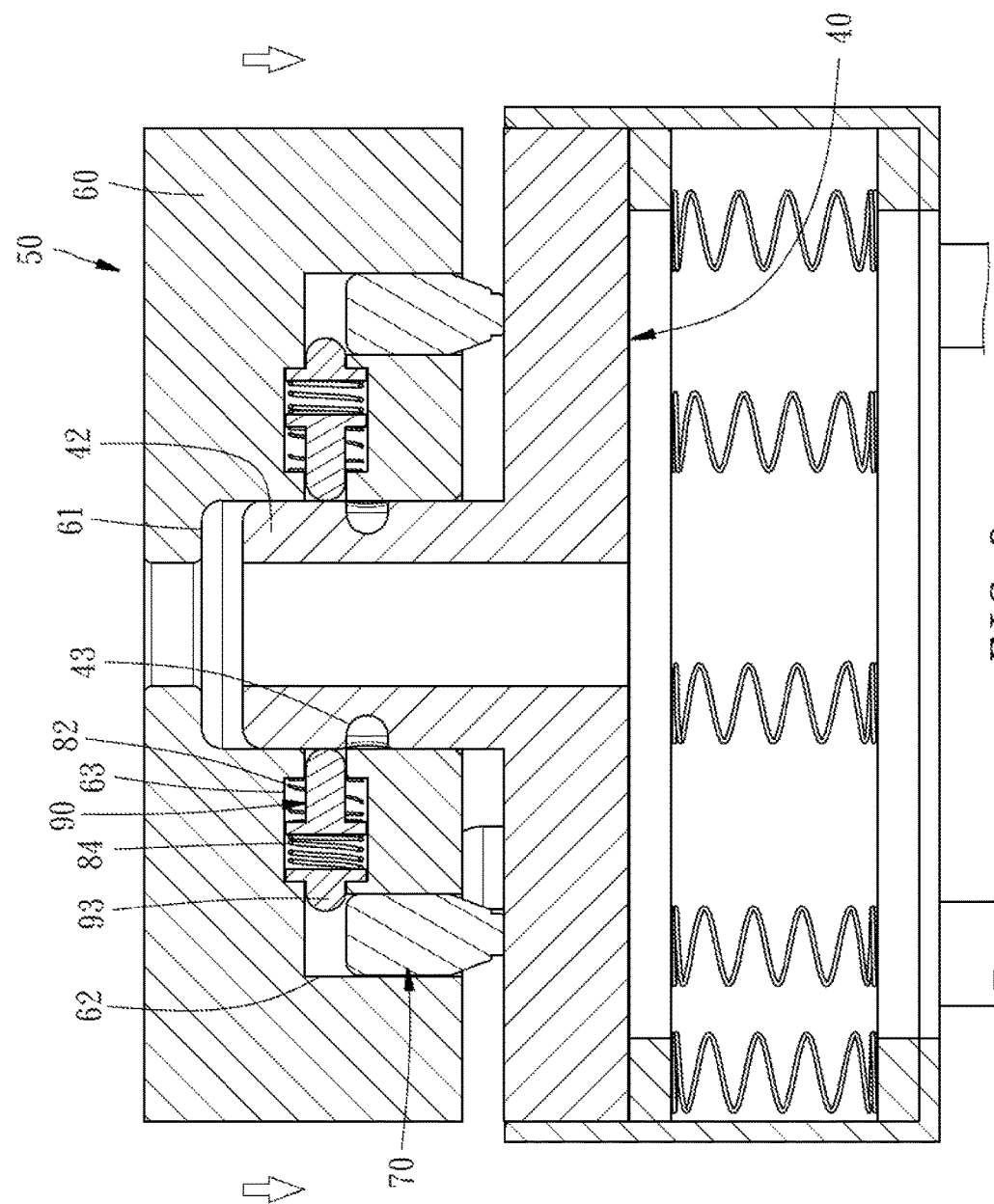
FIG. 9 is a sectional view of a mechanical end-effector changer in accordance with a second embodiment of the present invention, illustrating first movable members touched a first connection unit.
Figure 10:
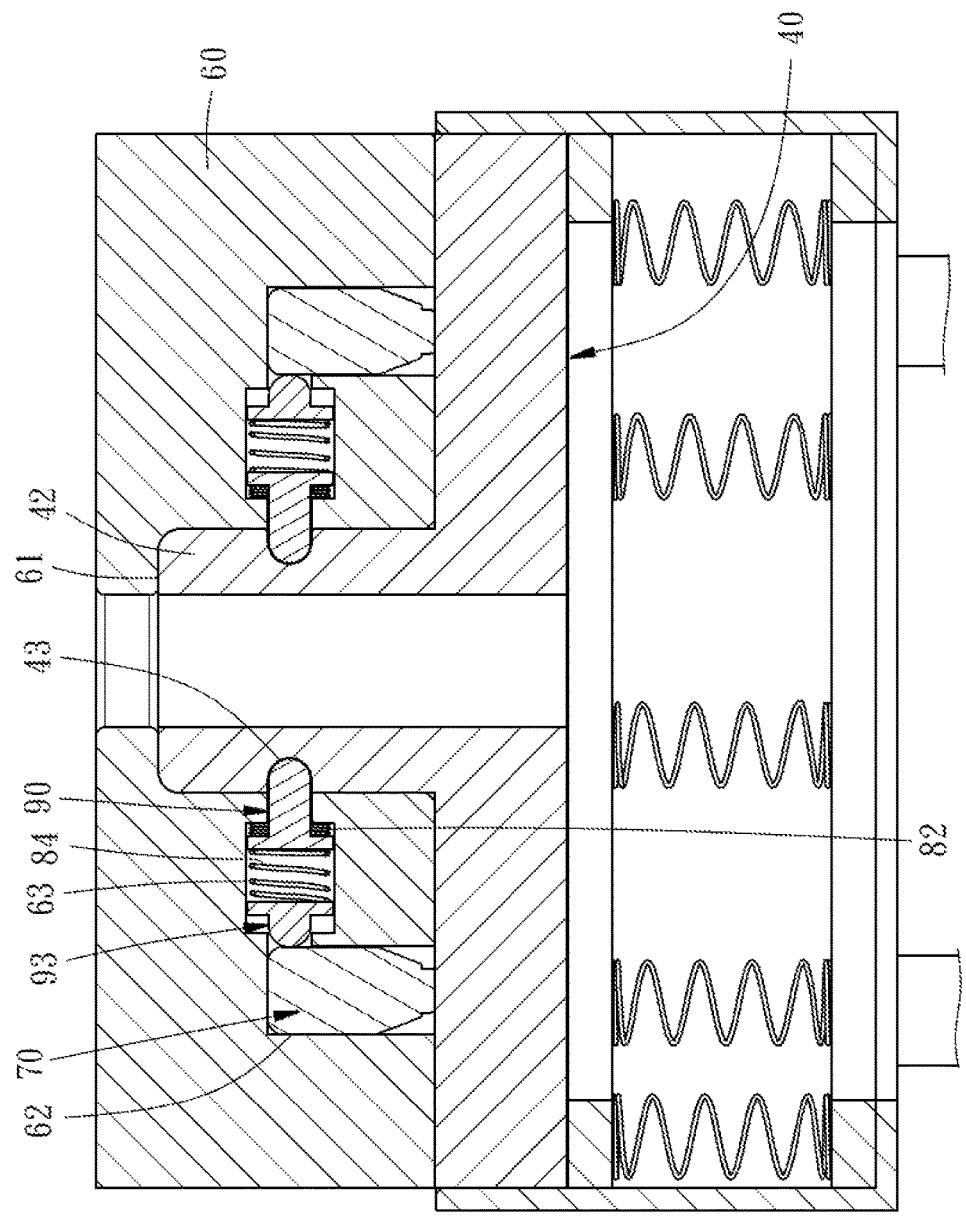
FIG. 10 is similar to FIG. 9, illustrating the second holder base in an engaged position.

Further, as shown in FIGS. 9 and 10, a mechanical end-effector changer achieving connection between a first connection unit 40 and a second connection unit 50 in accordance with a second embodiment is shown. According to this second embodiment, the first connection unit 40 comprises a post 42 with engagement holes 43. The second connection unit 50 comprises a second holder base 60, first movable members 70, second movable members 90, second elastic members 82, third movable members 93 and third elastic members 84. Each second holder base 60 comprises a first chamber 61, a plurality of second chambers 62, and a plurality of first through holes 63. The second holder base 60 is detachably coupled to the post 42 by its first chamber 61. The first through holes 63 are respectively disposed in communication between the first chamber 61 and the second chambers 62. The first movable members 70 are respectively mounted in the second chambers 62, and movable in and out of the respective second chambers 62. The second movable members 90 are respectively mounted in the first through holes 63, and movable out of the respective first through holes 63 into the respective engagement holes 43. The second elastic members 82 are respectively mounted in the first through holes 63, and adapted to move the respective second movable members 90 toward the respective first movable members 70. The third movable members 93 are respectively mounted in the first through holes 63 and movable out of the respective first through holes 63 to contact the respective movable members 70. The third elastic members 84 are adapted to move the respective second movable members 90 and the respective third movable members 93.

The second connection unit 50 can be carried by the robotic arm to move toward the first connection unit 40, attaching the first chamber 61 of the second holder base 60 onto the post 42 of the first connection unit 40. As soon as the second holder base 60 reaches the position where the first movable members 70 touch the first connection unit 40, the first movable members 70 is then moved upwardly to the inside of the second chamber. During upward movement, the first movable member 70 squeezes the third movable member 93, causing the third movable member 93 to retract into the first through hole 63 and to further compress the third elastic member 84 and then to push the second movable member 90. When overcome the elastic potential energy of the second elastic member 82, the second movable member 90 is moved in direction toward the post 42 of the first connection unit 40.

As illustrated in FIG. 10, when the second connection unit 50 and the first connection unit 40 are connected together, the first movable members 70 are completely received in the respective second chambers 62, and the third movable members 93 are respectively received in the respective first through holes 63, thus, the third elastic members 84 are squeezed by the respective third movable members 93 to push the respective second movable members 90, forcing the second movable members 90 to engage into the respective engagement holes 43, and thus, the second holder base 60 and the first connection unit 40 are locked together.

Thus, this second embodiment achieves the connection between the second connection unit 50 and the first connection unit 40.

It is to be noted that, the invention further comprises a method of using a mechanical end-effector changer in a robotic arm for end-effector change.

Referring also to FIGS. 5-8, the end-effector changer comprises a first connection unit 40 and a second connection unit 50. The first connection unit 40 comprises a first holder base 41 and a post 42 with an engagement hole 43. The second connection unit 50 comprises a second holder base 60, a first movable module A (for example, the aforesaid first movable member 70), a second movable module B (for example, the aforesaid second movable member 90 and third movable member 93), and a third movable module C (for example, the aforesaid fourth movable member 96). The axis of the second movable module B and the axis of the third movable module C extend perpendicular to the axis of the second holder base 60. The axis of the first movable module A extends in a parallel manner relative to the axis of the second holder base 60. Further, the first movable module A is arranged between the second movable module B and the third movable module C. The method comprises the steps of:

1. During the operation of the robotic arm to let the second connection unit 50 and the first connection unit 40 be connected together, enable the first movable module A to touch a top surface of the first holder base 41 of the first connection unit 40, and then enable the first movable module A to be moved toward a top surface of the second holder base 60 and the second movable module B to be moved toward the axis of the second holder base 60 to further force the second movable module B into engagement with the engagement hole 43 of the post 42 of the first connection unit 40.

2. During the operation of the robotic arm to separate the second connection unit 50 and the first connection unit 40, enable the second connection unit 50 to impart a downward pressure to the first connection unit 40 to move the third movable module C in direction toward the axis of the second holder base 60, and enable the first movable module A to be moved toward the top surface of the second holder base 60 to force the second movable module B in direction away from the axis of the second holder base 60 so as to disengage the second movable module B from the engagement hole 43 of the post 42 of the first connection unit 40.

Thus, the invention assists the robotic arm to change the end-effector, saving the operation cost and improving the end-effector changing efficiency.

What is claimed is:

1. A mechanical end-effector changer, comprising:
   a base frame;
   a damper mounted in said base frame;
   a first connection unit comprising a first holder base and a post, said first holder base being positioned on said damper, said post comprising an engagement hole; and
   a second connection unit comprising a second holder base, a first movable member, a first elastic member, a second movable member, a second elastic member, a third movable member, a third elastic member, a fourth movable member and a fourth elastic member, said second holder base comprising a first chamber, a second chamber, a first through hole and a second through hole, said second holder base being detachably coupled to said post by means of said first chamber, said first through hole being disposed in communication between said first chamber and said second chamber, said second through hole being disposed in communication between said second chamber and an outer perimeter of said second holder base, said first movable member being mounted in said second chamber and detachably abutted against said first holder base, said first elastic member being mounted in said second chamber and stopped against said first movable member, said second movable member being mounted in said first through hole and detachably engaged in said engagement hole of said post, said second elastic member being mounted in said first through hole and stopped against said second movable member, said third movable member being mounted in said first through hole and detachably connected to said first movable member, said third elastic member being mounted in said first through hole and stopped between said second movable member and said third movable member, said fourth movable member being mounted in said second through hole and squeezable by said base frame to push said first movable member, said fourth elastic member being mounted in said second through hole and adapted for moving said fourth movable member toward said outer perimeter of said second holder base.

2. The mechanical end-effector changer as claimed in claim 1, wherein said base frame comprises an inner flange; said damper comprises an upper bearing plate, a lower bearing plate and a plurality of viscoelastic damping elements, said upper bearing plate being adapted to support said first holder base of said first connection unit, said lower bearing plate being abutted against said inner flange of said base frame, said damping elements being connected between said upper bearing plate and said lower bearing plate.

3. The mechanical end-effector changer as claimed in claim 2, wherein said first elastic member, said second elastic member, said third elastic member, said fourth elastic member and said viscoelastic damping elements satisfy the relationship of: $K_5 > K_1 > K_3 > K_2$ and $K_1 > K_4$, wherein $K_1$ is the spring constant of said first elastic member; $K_2$ is the spring constant of said second elastic member; $K_3$ is the spring constant of said third elastic member; $K_4$ is the spring constant of said fourth elastic member; $K_5$ is the spring constant of said viscoelastic damping elements.

4. The mechanical end-effector changer as claimed in claim 1, wherein said first movable member comprises a first abutment portion and a first bearing portion; said second holder base is movable an engaged position where said first chamber of said second holder base is attached to said post of said first connection unit, said first bearing portion of said first movable member is abutted against a top surface of said first holder base of said first connection unit, and said first abutment portion of said first movable member pushes said third movable member into the inside of said first through hole, enabling said second movable member to be engaged into said engagement hole of said post of said first connection unit subject to the displacement of said third movable member and the elastic restoring force of said third elastic member.

5. The mechanical end-effector changer as claimed in claim 4, wherein said base frame comprises a peripheral wall; said inner flange is located at an inner perimeter of said peripheral wall; said first movable member further comprises a lower positioning groove disposed between said first abutment portion and said first bearing portion; said fourth movable member comprises a second abutment portion and a second bearing portion; said second holder base is movable to a release position where said second bearing portion of said fourth movable member is squeezed by said peripheral wall of said base frame and said second abutment portion of said fourth movable member pushes said first bearing portion of said first movable member away from the top surface of said first holder base of said first connection unit, enabling said third movable member to be engaged into said lower positioning groove of said first movable member subject to the displacement of said first movable member and the elastic restoring force of said third elastic member and also enabling said second movable member to be disengaged from said engagement hole of said post of said first connection unit subject to the displacement of said third movable member and the elastic restoring force of said second elastic member.

6. The mechanical end-effector changer as claimed in claim 5, wherein said first movable member comprises an upper positioning groove adjacent to said first abutment portion; said second holder base is movable to a separated position where said first chamber of said second holder base is separated from said post of said first connection unit and said first bearing portion of said first movable member is disposed outside said second chamber of said second holder base, enabling said second movable member to be retracted into said first through hole of said second holder base subject to the elastic restoring force of said second elastic member and also enabling said third movable member to be engaged into said upper positioning groove of said first movable member subject to the displacement of said second movable member and the elastic restoring force of said second elastic member.

7. The mechanical end-effector changer as claimed in claim 1, wherein said first holder base of said first connection unit comprises a locating rod located at a top surface thereof; said second holder base comprises a locating groove located at a bottom surface thereof and attachable to said locating rod of said first connection unit.

8. The mechanical end-effector changer as claimed in claim 1, wherein said damper is selected from the group of viscoelastic dampers, hydraulic dampers and vibration dampers.

9. A mechanical end-effector changer, comprising:
a first connection unit comprising a post, said post comprising an engagement hole; and
a second connection unit comprising a second holder base, a first movable member, a first elastic member, a second movable member, a second elastic member, a third movable member and a third elastic member, said second holder base comprising a first chamber, a second chamber and a first through hole, said second holder base being detachably coupled to said post by means of said first chamber, said first through hole being disposed in communication between said first chamber and said second chamber, said first movable member being mounted in said second chamber and movable in and out of said second chamber, said second movable member being mounted in said first through hole and partially movable out of said first through hole to engage into said engagement hole, said second elastic member being mounted in said first through hole and adapted for moving said second movable member toward said first movable member, said third movable member being mounted in said first through hole and partially movable out of said first through hole to contact said first movable member, said third elastic member being adapted for pushing said second movable member and said third movable member.

* * * * *